US005493270A

United States Patent [19]
Kondo

[11] Patent Number: 5,493,270
[45] Date of Patent: Feb. 20, 1996

[54] FAILURE MONITORING SYSTEM FOR PASSENGER RESTRAINT UNIT OF AUTOMOTIVE VEHICLE

[75] Inventor: Akira Kondo, Okazaki, Japan

[73] Assignee: Nippondenso Co., Ltd., Japan

[21] Appl. No.: 82,420

[22] Filed: Jun. 28, 1993

[30] Foreign Application Priority Data

Jun. 29, 1992 [JP] Japan ................................. 4-170807

[51] Int. Cl.$^6$ ................................................ B60R 21/00
[52] U.S. Cl. .......................................... 340/438; 280/735
[58] Field of Search ................................ 340/438, 435; 307/10.1; 324/500, 502, 503; 286/728.1, 735

[56] References Cited

U.S. PATENT DOCUMENTS 3,622,974  11/1971  Best et al. ........................... 340/438 X
5,038,134   8/1991  Kondo et al. ........................ 340/436 X
5,164,901  11/1992  Blackburn et al. ................... 340/436 X
5,293,153   3/1994  Rochette et al. ..................... 340/438

FOREIGN PATENT DOCUMENTS 4100755  4/1992  Japan.

Primary Examiner—Victor R. Kostak
Assistant Examiner—Nathan J. Flynn
Attorney, Agent, or Firm—Cushman Darby & Cushman

[57] ABSTRACT

A failure monitoring system is provided which may be employed in an automotive passenger restraint system adapted to be responsive to electric power applied from a power source to operate for protecting a vehicle occupant from impact upon occurrence of a vehicle collision. The failure monitoring system provides a failure monitoring signal to a predetermined element in the passenger restraint system before a preselected period of time has expired following actuation of an ignition switch, and monitors an operational condition of the predetermined element to detect occurrence of failure in the passenger restraint system based on the monitored operational condition.

7 Claims, 6 Drawing Sheets

FAILURE MONITORING SYSTEM FOR PASSENGER RESTRAINT UNIT OF AUTOMOTIVE VEHICLE

BACKGROUND OF THE INVENTION

1. Field of the Invention

The present invention relates generally to a passenger restraint unit for an automotive vehicle. More particularly, the invention is directed to a failure monitoring system for a passenger restraint unit such as an automotive airbag safety unit.

2. Description of the Prior Art

It is current practice to incorporate an airbag safety system into automotive vehicles for protecting a vehicle occupant from impact upon occurrence of an accidental collision. For assuring the air bag safety system operates properly, various failure monitoring systems for such as a collision detecting circuit have been proposed.

For example, a failure monitoring unit which includes a switch arranged in series with a collision detecting circuit is well known in the art. In this failure monitoring system, only immediately after a reset signal is provided in a reset circuit, or a power source is turned on, the switch is opened to inhibit the operation of the collision detecting circuit and the operational test is performed for monitoring a malfunction in the collision detecting circuit.

The above conventional failure monitoring system, however, encounters a drawback in that when the reset circuit breaks down or malfunctions due to noise input, the operational test may be performed regardless of the time the power source is turned on. This results in an airbag system being actuated unnecessarily.

SUMMARY OF THE INVENTION

It is therefore a principal object of the present invention to provide a solution for the disadvantages of the prior art.

It is another object of the invention to provide a failure monitoring system for a passenger restraint system such as an airbag safety system of an automotive vehicle.

According to one aspect of the present invention, there is provided a failure monitoring system for a passenger restraint system of an automotive vehicle which includes collision detecting means for detecting a collision of the vehicle and providing a signal indicative thereof and a passenger restraint unit which is responsive to the signal from the collision detecting means to protect a passenger from impact caused by the collision of the vehicle, which comprises a reset signal generating means, responsive to turning-on operation of an on-board power source, for providing a reset signal, a condition signal generating means, responsive to the turning-on operation of the on-board power source, for providing a condition signal indicative of a condition associated with the turning-on operation, and a failure monitoring means for monitoring a failure in the passenger restraint unit when both the reset signal and the condition signal are input to the failure monitoring means.

According to another aspect of the present invention, there is provided a failure monitoring system for a passenger restraint system of an automotive vehicle which includes collision detecting means for detecting a collision of the vehicle and providing a signal indicative thereof and a passenger restraint unit which is responsive to the signal from the collision detecting means to protect a passenger from impact caused by the collision, which comprises a reset signal generating means, responsive to turning-on operation of an on-board power source, for providing a reset signal, a failure monitoring means, responsive to the reset signal from the reset signal generating means, for monitoring a failure in the passenger restraint unit, and a failure monitoring operation restricting means for allowing the failure monitoring means to monitor the failure in the passenger restraint unit only within a preselected period of time after the on-board power source is turned on.

According to a further aspect of the invention, there is provided a failure monitoring system for a passenger restraint system of an automotive vehicle which comprises a first acceleration detecting means for detecting acceleration acting on a vehicle body to provide a signal indicative thereof, a second acceleration detecting means for detecting acceleration acting on the vehicle body when vehicle speed is greater than a preselected value, a collision detecting means, responsive to the signal from the first acceleration detecting means, for monitoring a collision of the vehicle to provide a collision indicative signal, a passenger restraint unit responsive to the collision indicative signal from the collision detecting means when the second acceleration detecting means detects the acceleration at vehicle speed greater than the preselected value to provide ignition current from a battery through an electric power actuating means for protecting a vehicle occupant from impact caused by the collision of the vehicle, a false signal generating means for providing a false signal required for said collision detecting means to output the collision indicative signal when monitoring a failure in the passenger restraint system, a selecting means for selecting either one of the signal from the first acceleration detecting means and the false signal from the false signal generating means to provide the selected one to the collision detecting means, a reset signal generating means, responsive to actuation of the electric power actuating means, for providing a reset signal, a condition signal generating means, responsive to the actuation of the electric power actuating means, for providing a condition signal indicative of a condition associated with the actuation of the electric power actuating means, a test signal generating means, responsive to both the reset signal and the condition signal, for outputting a test signal to the selecting means to provide the false signal to the collision detecting means, and a failure monitoring means for monitoring a failure in a circuit including the selecting means, the collision detecting means, and the passenger restraint unit based on the output of the test signal from the test signal generating means to the collision detecting means.

According to further aspect of the invention, there is provided a failure monitoring system for a passenger restraint system of an automotive vehicle which is responsive to electric power applied from a power source to be active to protect a vehicle occupant from impact upon occurrence of a vehicle collision, comprising, a first means for determining whether a preselected period of time has expired or not after the power source is actuated to provide the electric power to the passenger restraint system and providing a signal when time following actuation of the power source is within the preselected period of time, a second means, responsive to the signal from the first means, for providing a failure monitoring signal to the passenger restraint system, and a third means for monitoring an operational condition of a predetermined element in the passenger restraint system after the failure monitoring signal is input to the predetermined element to detect occurrence of failure in the passenger restraint system based on the monitored operational condition.

In the preferred mode, the first means includes a capacitor in which voltage applied from the power source is charged, and provides the signal indicating that the time following actuation of the power source is within the preselected period of time when a charged voltage level of the capacitor is lower than a preselected level. The first means may alternatively be provided with a counter which is responsive to the electric power supplied from the power source upon actuation of the power source to provide a reset signal. The second means provides the failure monitoring signal when time following provision of the reset signal is within the preselected period of time. The first means may further include an AND gate and a control unit, the control unit being responsive to actuation of the power source to provide a reset signal, the AND gate being responsive to the reset signals from the counter and the control unit to provide a signal which serves to activate the second means to provide the failure monitoring signal.

Additionally, the predetermined element in the passenger restraint system may be responsive to a signal having a preselected level to be energized to allow the electric power from the power source to be supplied to a passenger restraint unit. The second means provides the failure monitoring signal having the preselected level to monitor energization of the preselected element of the passenger restraint system.

The third means may detect a voltage level applied to the preselected element of the passenger restraint system to become active to detect the occurrence of failure in the passenger restraint system when the voltage level represents a preselected level.

BRIEF DESCRIPTION OF THE DRAWINGS

The present invention will be understood from the detailed description given hereinbelow and from the accompanying drawings of the preferred embodiments which are given for explanation and understanding only and are not intend to imply limitation to the invention.

In the drawings.

DESCRIPTION OF THE PREFERRED EMBODIMENT

Figure 1:
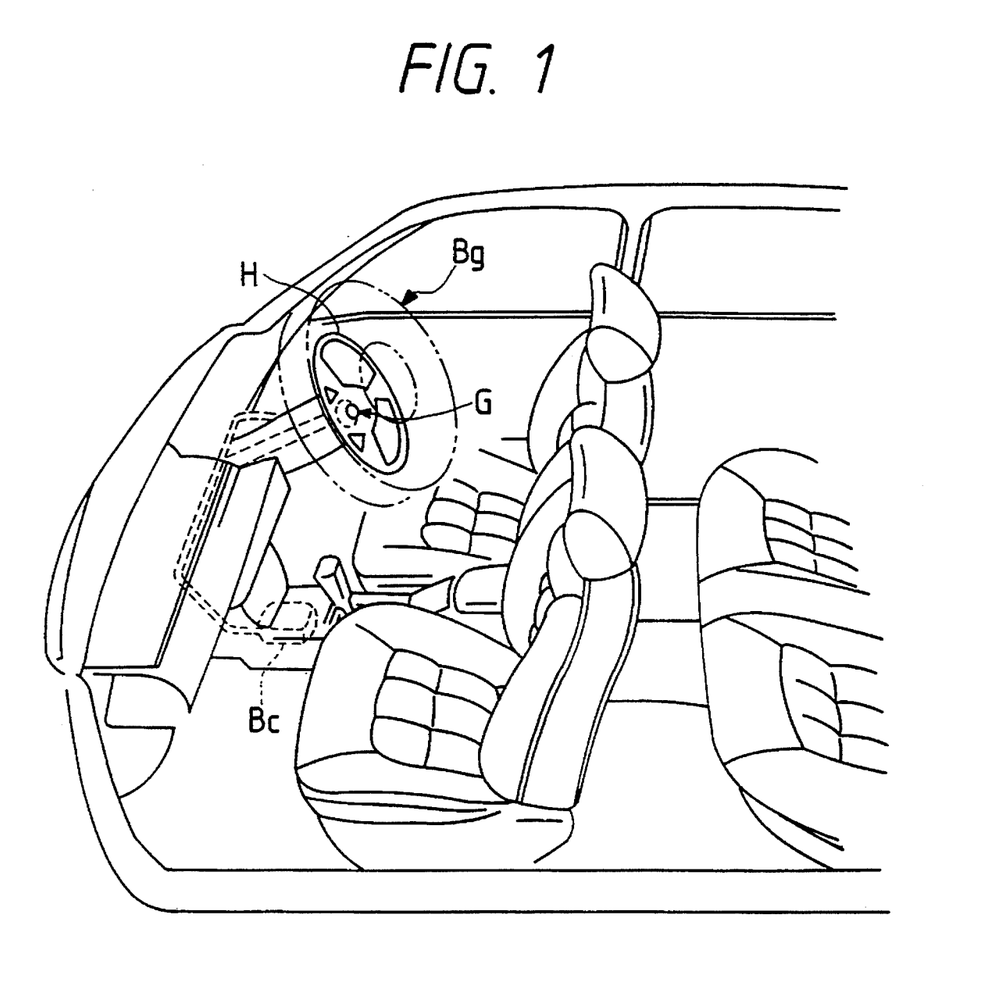
FIG. 1 is a perspective view which shows an airbag system to which a failure monitoring system according to the present invention is applied.
Figure 2:
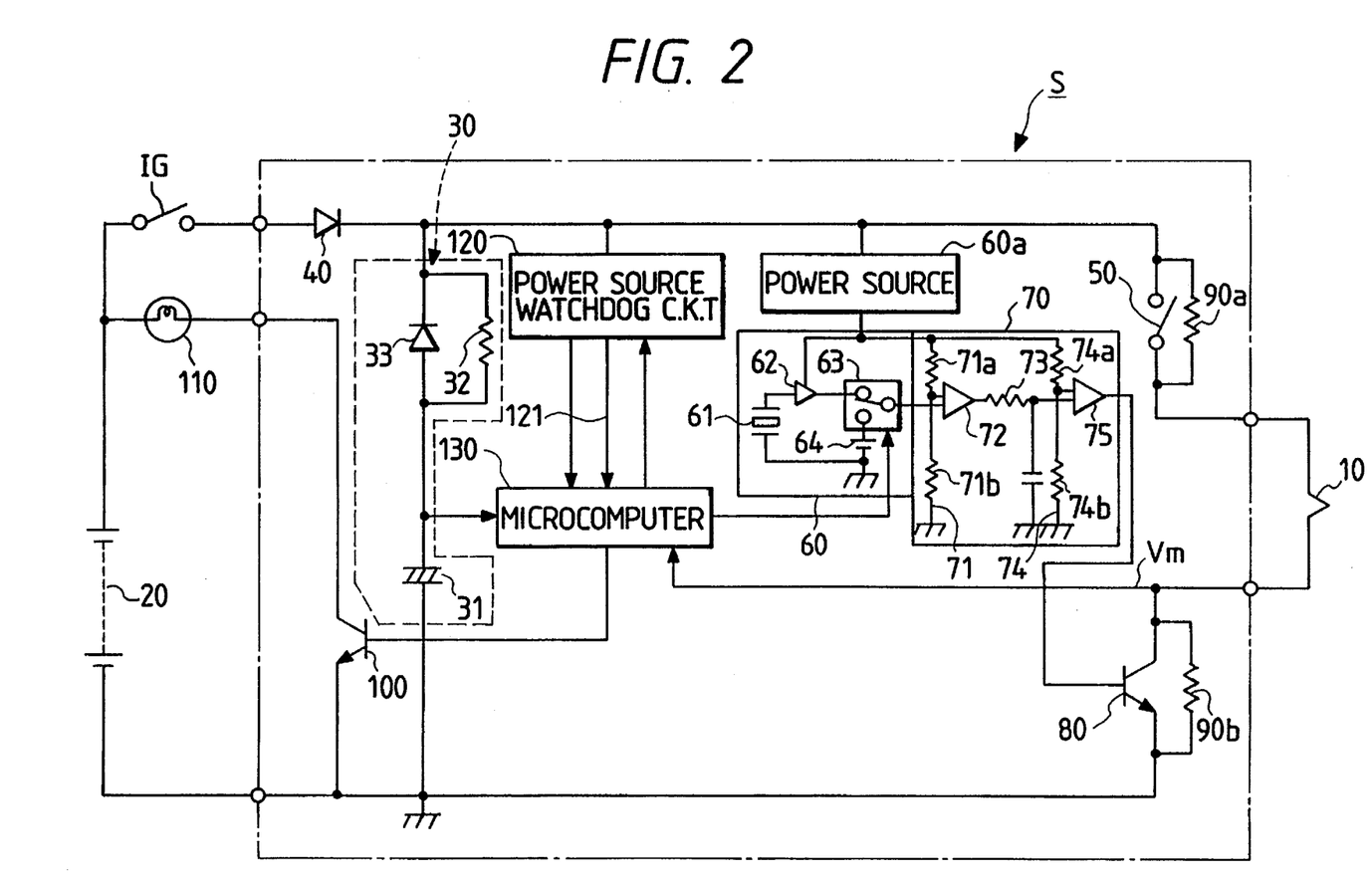
FIG. 2 is a circuit diagram which shows a failure monitoring system of the invention.

Referring now to the drawings, wherein like numbers refer to like parts in several views, particularly to FIGS. 1 and 2, there is shown a failure monitoring system for an airbag safety system of an automotive vehicle according to the present invention. The shown airbag safety system includes generally an inflatable airbag Bg disposed within a steering wheel H, a gas generator G installed in the central portion of the steering wheel H, and an airbag starting unit S (i.e., an airbag control unit) arranged in a console box Bc in a passenger compartment. The gas generator G includes therein an ignition element 10 which is responsive to ignition current input to radiate thermal energy, causing the gas generator G to burst so that gas stored in a gasholder (not shown) is discharged quickly into the air bag for inflating it.

The airbag starting unit S includes an auxiliary power source 30 in addition to a battery 20 installed in an engine compartment. The auxiliary power source 30 includes a back-up capacitor 31, a charging resistor 32, and a discharging diode 33 arranged in parallel to the resistor 32. The back-up capacitor 31 is connected to ground, and is also connected to a positive terminal of the battery 20 through a parallel circuit consisting of the resistor 32 and the diode 32, a diode 40, and an ignition switch IG. With this arrangement, the back-up capacitor 31 is charged by d.c. voltage applied from the battery 20 through the ignition switch IG, the diode 40, and the resistor 32, and discharges the charged energy of capacitor voltage Vc through the diode 33. In this circuit, a charging time constant which is defined by the capacitance of the back-up capacitor 31 and a resistant value of the resistor 32 is set to 2 or 3 seconds. Additionally, a discharging time constant which is defined by the capacitance of the back-up capacitor 31 and a maximum current of the circuit is set to approximately 100–200 msec.

The airbag starting unit S further includes an acceleration detecting switch 50, an acceleration detecting circuit 60, a collision detecting circuit 70, a driving transistor 80, a constant-voltage power source 120, and a control unit provided with a microcomputer 130.

The acceleration detecting switch 50 serves as a safety switch of a normal open type which is arranged to be closed when acceleration acting on a vehicle body exceeds a preselected threshold value.

The acceleration detecting circuit 60 includes an acceleration sensor 61, a buffer 62, an analog signal change-over switch 63, and a reference voltage generator 64. The acceleration sensor 61 monitors acceleration acting on the vehicle body and provides a sensor signal indicative thereof. The buffer 62 receives a constant voltage of 5 V from a constant-voltage power source 60a to amplify the sensor signal from the acceleration sensor 61 to provide an acceleration indicative signal. The analog signal change-over switch 63 is arranged to selectively establish a first switching position which outputs the acceleration indicative signal amplified by the buffer 62 and a second switching position which provides a reference voltage signal from the reference voltage generator 64. The constant-voltage power source 60a is responsive to the d.c. voltage applied from the battery 20 through the ignition switch IG and the diode 40 or the capacitor voltage Vc applied from the back-up capacitor 31 through the resistor 32 and the diode 33 to provide the constant voltage of 5 V.

The collision detecting circuit 70 includes a voltage divider 71, a comparator 72, an integrating circuit 73, a voltage divider 74, and a comparator 75. The voltage divider 71 includes resistors 71a and 71b which are operable to modify output voltage from the constant-voltage power source 60a to provide a preselected fraction of the total voltage from the constant-voltage power source 60a. The comparator 72 is arranged to compare either one of the acceleration indicative signal and the reference voltage signal from the analog signal change-over signal 63 with the output voltage from the voltage divider 71 so that a HIGH-LEVEL signal is output when the acceleration indicative signal or the reference voltage signal is greater than the voltage divider output, while a LOW-LEVEL signal is produced when the acceleration indicative signal or the reference voltage signal is smaller than the voltage divider output.

The integrating circuit 73 is adapted to produce an integrated voltage having a preselected level after a lapse of a preselected delay time following reversal from the LOW-LEVEL signal to the HIGH-LEVEL signal in the comparator 72. The voltage divider 74 includes resistors 74a and 74b which modifies the output voltage from the constant-voltage power source 60a to produce a preselected fraction of the total voltage provided by the constant-voltage power source 60a. The comparator 75 compares the integrated voltage signal from the integrating circuit 73 with the output voltage from the voltage divider 74 to provide a HIGH-LEVEL signal when the integrated voltage signal is greater in level than the voltage divider output, while a LOW-LEVEL signal is produced when the integrated voltage signal is smaller in level than the voltage divider output.

The transistor 80 is arranged to be energized upon reversal from LOW to HIGH levels of the signal from the comparator 75 in the collision detecting circuit 70, while it is deenergized upon reversal of the signal from HIGH to LOW levels. A resistor 90a is arranged in parallel to the acceleration detecting switch 50. A resistor 90b is connected between an emitter and a collector of the transistor 80. Both the resistors 90a and 90b exhibit a relatively high resistance, and are short-circuited when the acceleration detecting switch 50 is closed and when the transistor 80 is energized, respectively. This causes either direct current from the battery 20 through the ignition switch IG and the diode 40 or discharged current from the back-up capacitor 31 through the resistor 32 and the diode 33 to flow as ignition current through the acceleration detecting switch 50, the ignition element 10, and the emitter and the collector of the transistor 80, thereby causing the gas generator 10 to eject gas into the airbag Bg to inflate it for restraining a vehicle occupant against a seat in safety from serious impact caused by an accidental collision. Note that when the acceleration detecting switch 50 is opened and/or when the transistor 80 is deenergized, the ignition current supplied to the ignition element 10 is limited to a lower level because of a current flow restriction by the transistors 90a and/or 90b. Only when the ignition current is flowing through the ignition element 10, a lighting transistor is energized to produce a current flow through an alarm lamp 110 for lighting it.

The constant-voltage power source 120 modifies the d.c. voltage applied from the battery 20 through the ignition switch IG and the diode 40 to produce a constant voltage of 5 V, and also provides a reset pulse signal through a line 121 at a time when the d.c. voltage is applied upon actuation of the ignition switch IG. The constant-voltage power source 120 includes a watchdog circuit which is operable to produce a reset pulse signal through the line 121 when the microcomputer 130 outputs no reset pulse signal for a fixed period of time, as the microcomputer 130 is malfunctioning.

Figure 3:
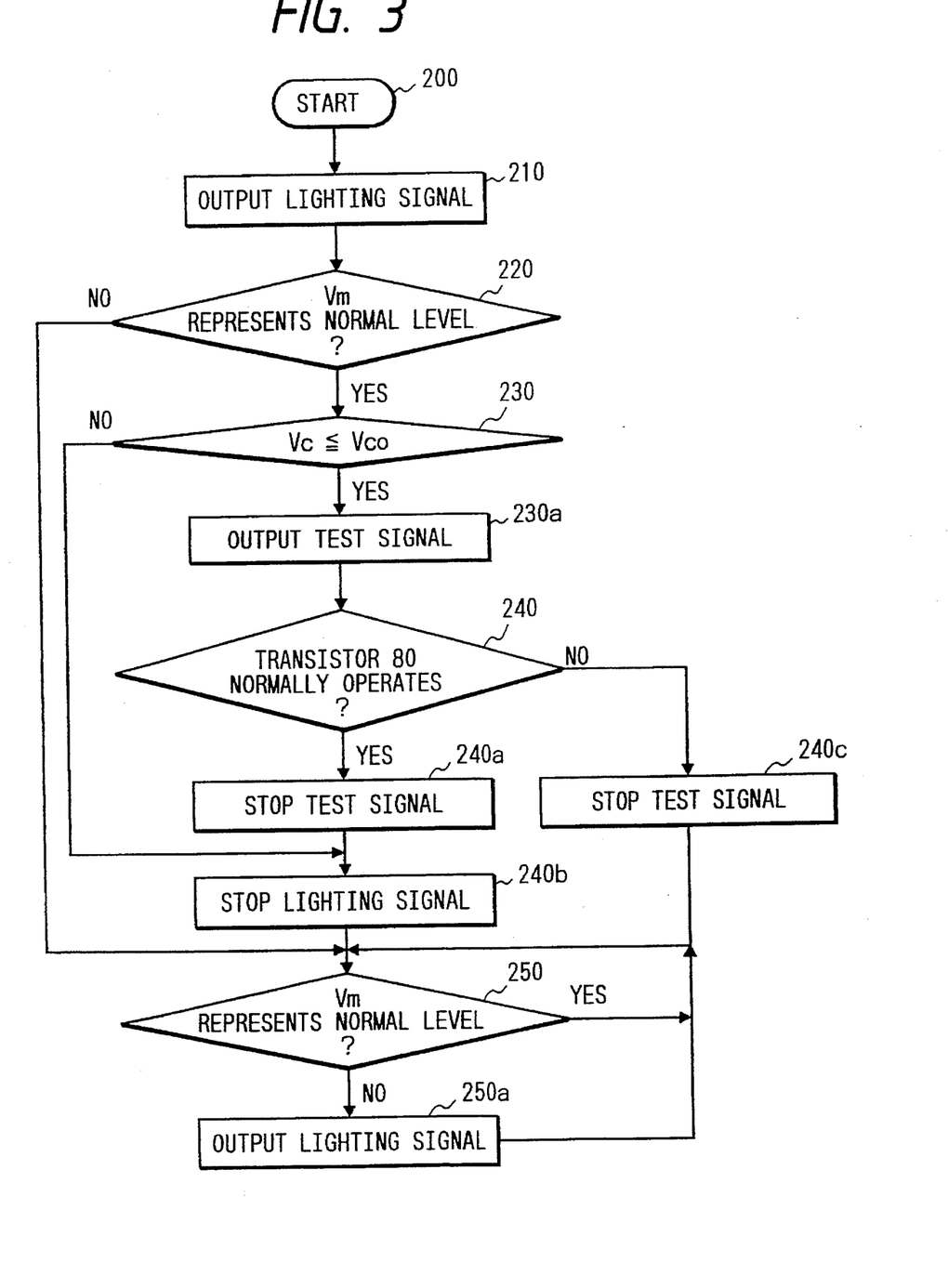
FIG. 3 is a flowchart which shows logical steps performed by a failure monitoring system of the invention.

The microcomputer carries out a given program, as shown in FIG. 3, which is pre-stored in a ROM, to monitor a voltage level (as will be referred to as a monitored voltage Vm hereinafter) appearing on a common terminal of the ignition element 10, the collector of the transistor 80, and the resistor 90b for detecting a failure of the circuit for activating the ignition element 10 such as due to a short circuit. The microcomputer 130 is driven by the constant-voltage power source 120, and is responsive to a reset pulse signal therefrom to carry out the given program. In addition, the microcomputer 130 includes an A-D converter.

In operation, turning on the ignition switch IG to apply the d.c. voltage from the battery 20 to the auxiliary power source 30 and the constant voltage power sources 120 and 60a through the diode 40 causes the back-up capacitor 31 to be charged with the d.c. voltage applied through the charging resistor 32. The back-up capacitor 31 then begins to produce the capacitor voltage Vc having a level corresponding to the voltage charged therein. The constant voltage power source 120 is responsive to the d.c. voltage from the battery 20 to provide the constant voltage of 5 V to the microcomputer 130 and the reset pulse signal thereto through the line 121. The constant voltage power source 60a is also responsive to the d.c. voltage from the battery 20 to provide the constant voltage of 5 V to the acceleration detecting circuit 60 and the collision detecting circuit 70. When the acceleration detecting switch 50 is open and the transistor 80 is deenergized, the d.c. voltage from the battery 20 flows through the resistor 90a, the ignition element 10, and the resistor 90b to drop to produce a small amount of current flow.

The microcomputer 130 is then responsive to the output voltage from the constant voltage power source 120 to be turned on, and also responsive to the reset pulse signal input through the line 121 to perform the given program, as shown in FIG. 3.

After initiating the program at step 200, the routine then proceeds to step 210 wherein a lighting signal is output to the transistor 100 to be energized so that the alarm lamp 110 is turned on. This enables a driver to visually perceive that the microcomputer 130 has entered the program in response to the actuation of the ignition switch IG to determine whether the transistor 80, the acceleration detecting circuit 60, the collision detecting circuit 70, or circuits connecting therebetween are normally operating or not.

The routine then proceeds to step 220 wherein it is determined whether the monitored voltage Vm appearing on the common terminal connecting among the ignition element 10, the transistor 80, and the resistor 90b represents a normal level (i.e., a preselected threshold level) or not. If a YES answer is obtained, the microcomputer 130 converts the monitored voltage Vm into a digital signal by means of the A-D converter. The routine then proceeds to step 230 wherein it is determined whether the capacitor voltage Vc output from the back-up capacitor 31 is smaller than a preselected threshold voltage Vco or not. The threshold voltage Vco is set to a voltage level of the back-up capacitor 31 before the preselected delay time expires following the actuation of the ignition switch IG which is lower than a maximum voltage level of the back-up capacitor 31 when being fully charged. If a YES answer is obtained, concluding that the ignition switch IG has just been turned on and the microcomputer 130 is now active to detect failures in the transistor 80, the acceleration detecting circuit 60, or the collision detecting circuit 70, the routine then proceeds to step 230a wherein a test signal of a high level is input to the analog signal change-over switch 63 of the acceleration detecting circuit 60 to change from the first switching position to the second switching position, applying the reference voltage from the reference voltage generator 64 to the collision detecting circuit 70. The comparator 72 of the collision detecting circuit 70 then outputs the HIGH-LEVEL signal as the reference voltage from the reference voltage generator 64 is higher than the output voltage from the voltage divider 71. After a lapse of the preselected delay time, the integrating circuit 73 provides the integrated voltage having the preselected level, as already mentioned.

The comparator 75 of the collision detecting circuit 70 then outputs the HIGH-LEVEL signal as the integrated voltage is greater than the output voltage from the voltage divider 74, thereby energizing the transistor 80 to cause the resistor 90b to be short-circuited. This results in the monitored voltage Vc being reduced toward a ground potential level.

After step 230a, the routine proceeds to step 240 wherein it is determined whether the monitored voltage Vm has dropped to the ground potential level within a preselected period of time or not after the test signal is output in step 230a. This preselected period of time is set to be longer than a time required for the transistor 80 to have been energized normally after the output of the test signal in step 230a.

If a YES answer is obtained in step 240, it may be concluded that the transistor has normally operated and thus there is no failure in the circuit extending through the acceleration detecting circuit 60 and the transistor 80. The routine then proceeds to step 240a wherein the microcomputer 130 stops outputting the test signal to have the analog signal change-over switch 63 shifted to the first switching position. Afterwards, the routine proceeds to step 240b wherein the microcomputer 130 stops outputting the lighting signal to the lighting transistor 100 to turn off the alarm lamp 110. This enables the driver to visually perceive that the transistor 80 normally operates and there is no malfunction in the system on condition that the constant voltage power source 120 has outputted the reset pulse signal immediately after the ignition switch IG is turned on and the capacitor voltage Vc from the back-up capacitor 31 is less than the preselected threshold voltage Vco. Thereafter, the routine proceeds to step 250 wherein it is determined whether the monitored voltage Vm indicates the normal level or not. If a YES answer is obtained, the routine repeats step 250.

During repetition of step 250, it is assumed that a vehicle starts to travel on condition that the back-up capacitor 31 is charged fully so that the capacitor voltage Vc becomes greater than the preselected threshold voltage Vco. Under these conditions, in the event that the microcomputer 130 fails to provide the reset pulse signal within the preselected period of time, the watchdog circuit of the constant voltage power source 120 serves to provide the reset pulse signal to the microcomputer 130 through the line 121. Additionally, although the microcomputer 130 is normally operating, noise may appear on the line 121 due to static electricity or so forth to be inputted to the microcomputer 130 as the reset pulse signal.

In the above cases, the microcomputer starts to carry out the program again from step 200 in response to the reset pulse signal from the constant voltage power source 120 or the noise signal appearing on the line 121. If a YES answer is obtained in step 220 concluding that the capacitor voltage Vm indicates the normal level, the routine then proceeds to step 230 wherein it is determined whether the capacitor voltage Vc is less than or equal to the preselected threshold voltage Vco or not. At this time, since the capacitor voltage Vc, as mentioned above, becomes greater than the preselected threshold voltage Vco, a NO answer is obtained in step 230 concluding that a preselected period of time has expired following the actuation of the ignition switch IG. The routine then proceeds directly to step 240b wherein the microcomputer 130 inhibits the lighting signal from being sent to the lighting transistor 100, thereby turning off the alarm lamp 110. Therefore, after the preselected period of time has expired following the actuation of the ignition switch IG, the driver may visually perceive that the logical operation of the microcomputer 130 has terminated without outputting the test signal to initiate the above described failure detecting process.

It will be appreciated that even when the acceleration detecting switch is closed temporarily due to vertical vibrations of the vehicle body caused by protrusions of a road surface while the vehicle is traveling, the system prevents the starting current from flowing through the ignition element 10 since the microcomputer 130 does not output the test signal causing the transistor 80 to be energized after a lapse of the preselected period of time following the actuation of the ignition switch IG.

In the case where after the YES answer is obtained in step 230, the NO answer is obtained in step 240, the routine is directed to step 240c wherein the microcomputer 130 stops outputting the test signal to change the analog signal change-over switch 63 to the first switching position, concluding that a failure occurs in the transistor 80, the acceleration detecting circuit 60, the collision detecting circuit 70, or the lines connected to the transistor 80. Afterwards, the routine flows to step 250 while maintaining the alarm lamp turned on. This enables the driver to visually perceive that the failure has occurred in the transistor 80, the acceleration detecting circuit 60, the collision detecting circuit 70, or the lines connected to the transistor 80.

Alternatively, if a NO answer is obtained in step 220, the routine proceeds directly to step 250, while maintaining the alarm lamp 110 turned on. If a NO answer is obtained in step 250, the routine then proceeds to step 250a wherein the lighting signal is provided to turn on the alarm lamp 110.

The failure monitoring system of the invention is, as discussed above, responsive to the reset pulse signal output from the constant voltage power source 120 upon turning-on operation of the ignition switch IG to provide the test signal dependent upon if the capacitor voltage Vc is less than the preselected threshold voltage Vco for determining whether or not the voltage provided should be applied to the transistor 80 through the acceleration detecting circuit 60 and the collision detecting circuit 70 for failure monitoring test purposes. After the preselected period of time has expired following the actuation of the ignition switch, the system does not initiate the failure detecting process under the condition that the capacitor voltage Vc is greater than the preselected threshold voltage Vco even when the reset pulse signal from the constant voltage power source 120 and/or a noise signal equivalent to the reset pulse signal are input to the microcomputer 130.

It will be noted that the failure monitoring system of the invention is capable of determining whether the starting unit S is malfunctioning or not immediately after starting the vehicle, and prevents the transistor 80 from being energized caused by a malfunction of the acceleration detecting switch 50 while the vehicle is traveling, which may produce a current flow through the starting element 10 to inflate the air bag unnecessarily.

Figure 4:
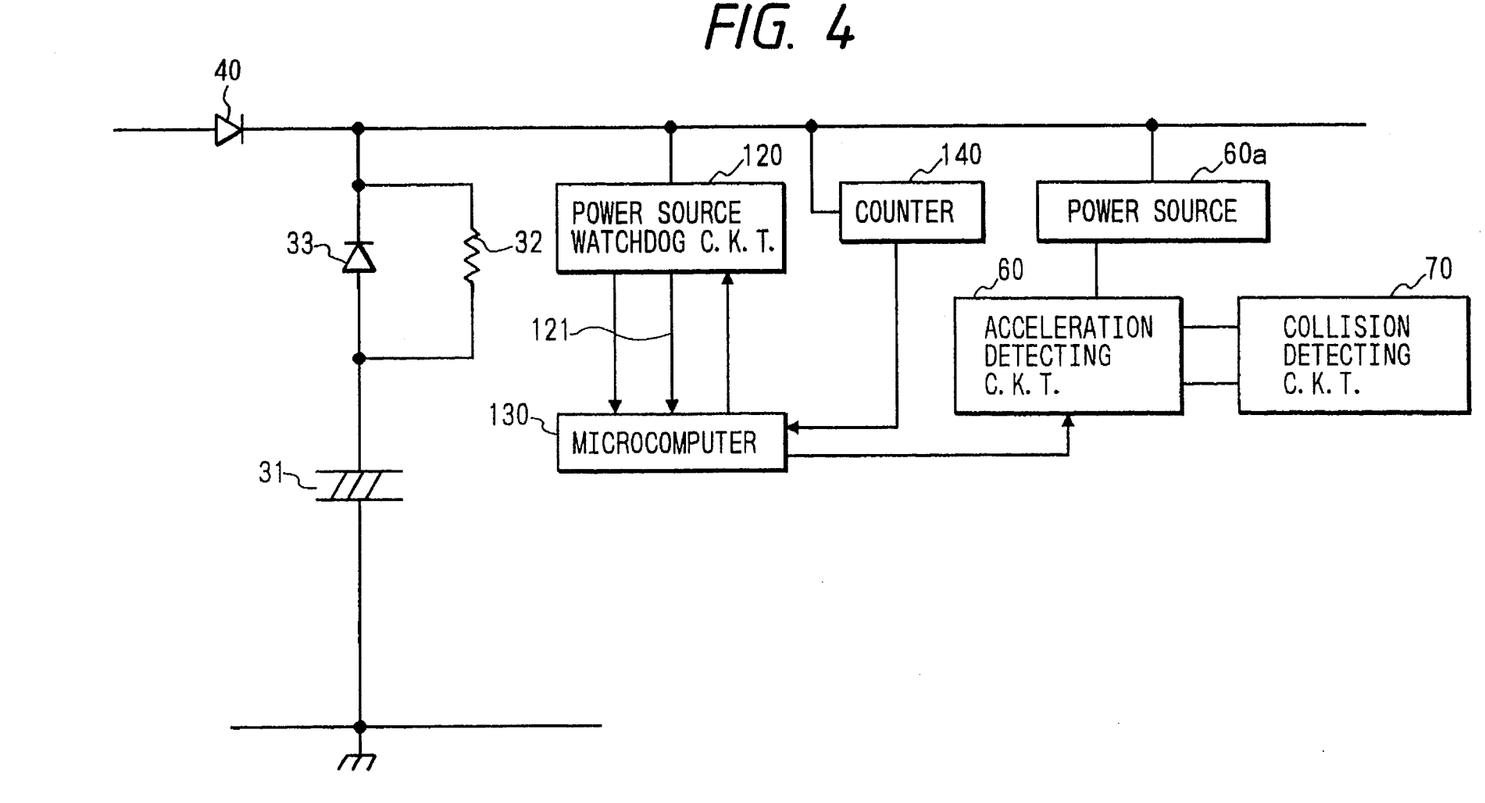
FIG. 4 is a circuit diagram which shows an essential part of a failure monitoring system of an alternative embodiment.
Figure 5:
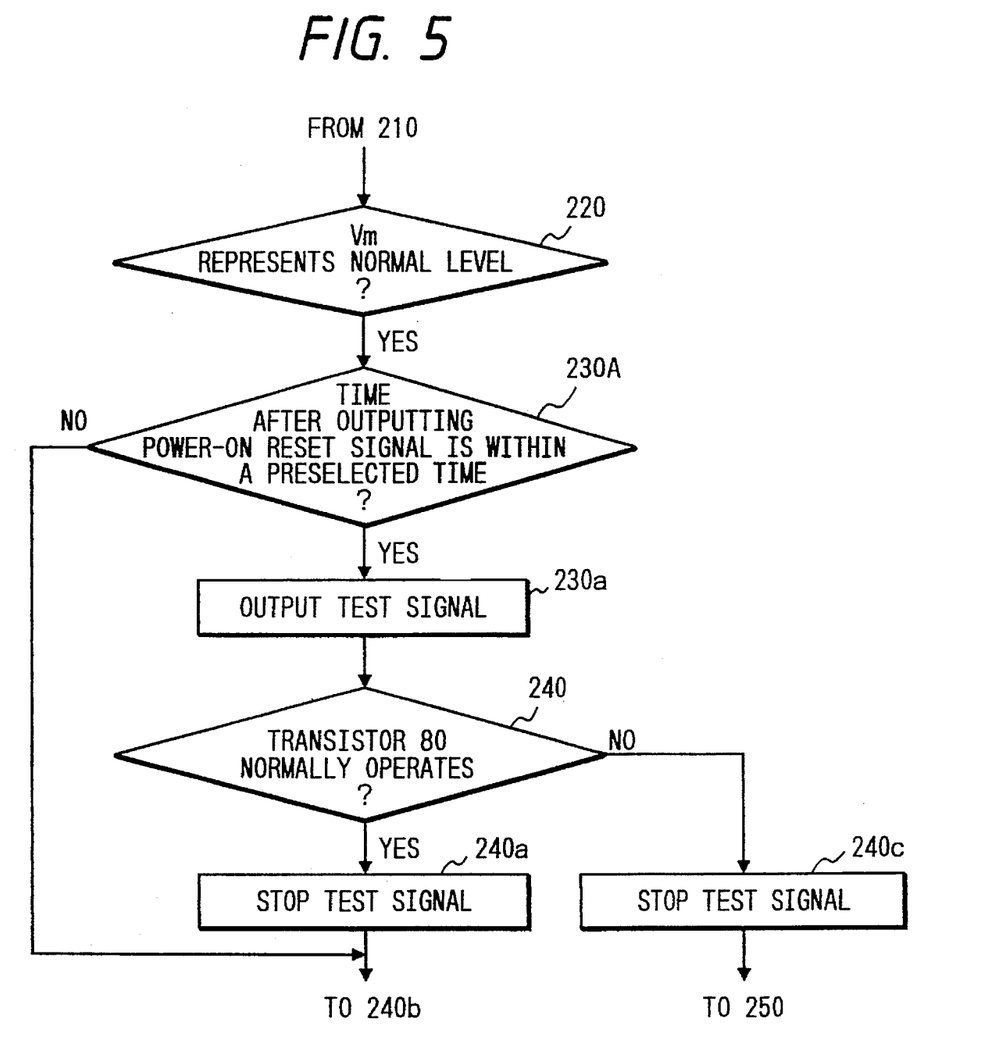
FIG. 5 is a flowchart which shows logical steps performed by a failure monitoring system as shown in FIG. 4.

Referring to FIGS. 4 and 5, there is shown an alternative embodiment according to the present invention. This embodiment is, as shown in FIG. 4, different in structure from the above mentioned first embodiment only in that a counter 140 is arranged between the diode 40 and the microcomputer 130. Additionally, in program sequence, as shown in a flowchart of FIG. 5, step 230A is provided in place of step 230 as shown in FIG. 3. The other arrangements and operation are the same as those of the first embodiment and explanation thereof in detail will be omitted here.

In operation, when the ignition switch IG is turned on to apply the d.c. voltage from the battery 20 to the auxiliary power source 30, the constant voltage power sources 120 and 60a, and the counter 140 through the diode 40, the back-up capacitor 31 produces the capacitor voltage Vc, similar to the first embodiment. At the same time, the constant voltage power source 120 provides the constant voltage of 5 V and the reset pulse signal. The constant voltage power source 60a also provides the constant voltage of 5 V. The counter 140 is responsive to the d.c. voltage from the battery 20 to output a power-on reset pulse signal to the microcomputer 130.

In the flowchart as shown in FIG. 5, if a YES answer is obtained in step 220, concluding that the monitored voltage Vm represents the normal level, the routine then proceeds to step 230A wherein it is determined if time after the counter 140 outputs the power-on reset pulse signal is within a preselected period of time T. If a YES answer is obtained, concluding that the preselected period of time has not expired after the counter 140 outputs the power-on reset signal, the routine then proceeds to the same steps 230a to 250 as the first embodiment wherein it is determined whether the transistor 80 is normally energized or not. When the monitored voltage Vm indicates the normal level, the step 250 is repeated.

It is assumed that a vehicle starts to travel during repetition of step 250 and the preselected period of time T has expired after the counter 140 outputs the power-on reset pulse signal. Under these conditions, in the event that the microcomputer 130 fails to provide the reset pulse signal within the preselected period of time, the watchdog circuit of the constant voltage power source 120 serves to provide the reset pulse signal to the microcomputer 130 through the line 121. Additionally, although the microcomputer 130 is normally operating, the noise may appear on the line 121 due to static electricity or other such malfunction to be inputted to the microcomputer 130 as the reset pulse signal. When such conditions exist, the microcomputer starts to carry out the program again from step 200, as shown in FIG. 3, in response to the reset pulse signal from the constant voltage power source 120 or the noise signal appearing on the line 121. After step 220, the routine proceeds to step 230A wherein a NO answer is obtained, concluding that the ignition switch has just not been turned on as the preselected period of time T has expired following the output of the power-on reset pulse signal from the counter 140. The routine thus proceeds directly to step 240b wherein the alarm lamp 110 is turned off. This enables the driver to visually perceive that the logical operation of the microcomputer 130 has terminated without performing the failure detecting process after the preselected period of time has expired following the actuation of the ignition switch IG.

As discussed above, if the NO answer is obtained in step 230A, the microcomputer 130 omits the logical steps 130a to 240a. This prevents a failure from occurring which may cause the ignition current to flow through the ignition element 10 when the microcomputer 130 outputs the test signal to energize the transistor 80 and the acceleration detecting switch is closed temporarily due to vertical vibrations acting on the vehicle body caused by protrusions of a road surface after the preselected period of time has expired following the actuation of the ignition switch IG.

Additionally, if the NO answer is obtained in step 240 after the YES answer is obtained in step 230A, the routine flows to step 240c while maintaining the alarm lamp turned on, concluding that failures have occurred in the transistor 80, the acceleration detecting circuit 60, the collision detecting circuit 70, and/or the lines connected to the transistor 80.

The failure monitoring system of this second embodiment is, as explained above, to detect a failure in the airbag starting unit S based on the test signal within the preselected period of time T after the reset pulse signal from the power source 120 and the power-on pulse signal from the counter 140 are provided in response to the turning-on operation of the ignition switch IG. Additionally, after the preselected period of time T, even when the reset pulse signal from the constant voltage power source 120 and/or the equivalent noise signal appearing on the line 121 are inputted to the microcomputer 130, the failure detecting process is not initiated.

Figure 6:
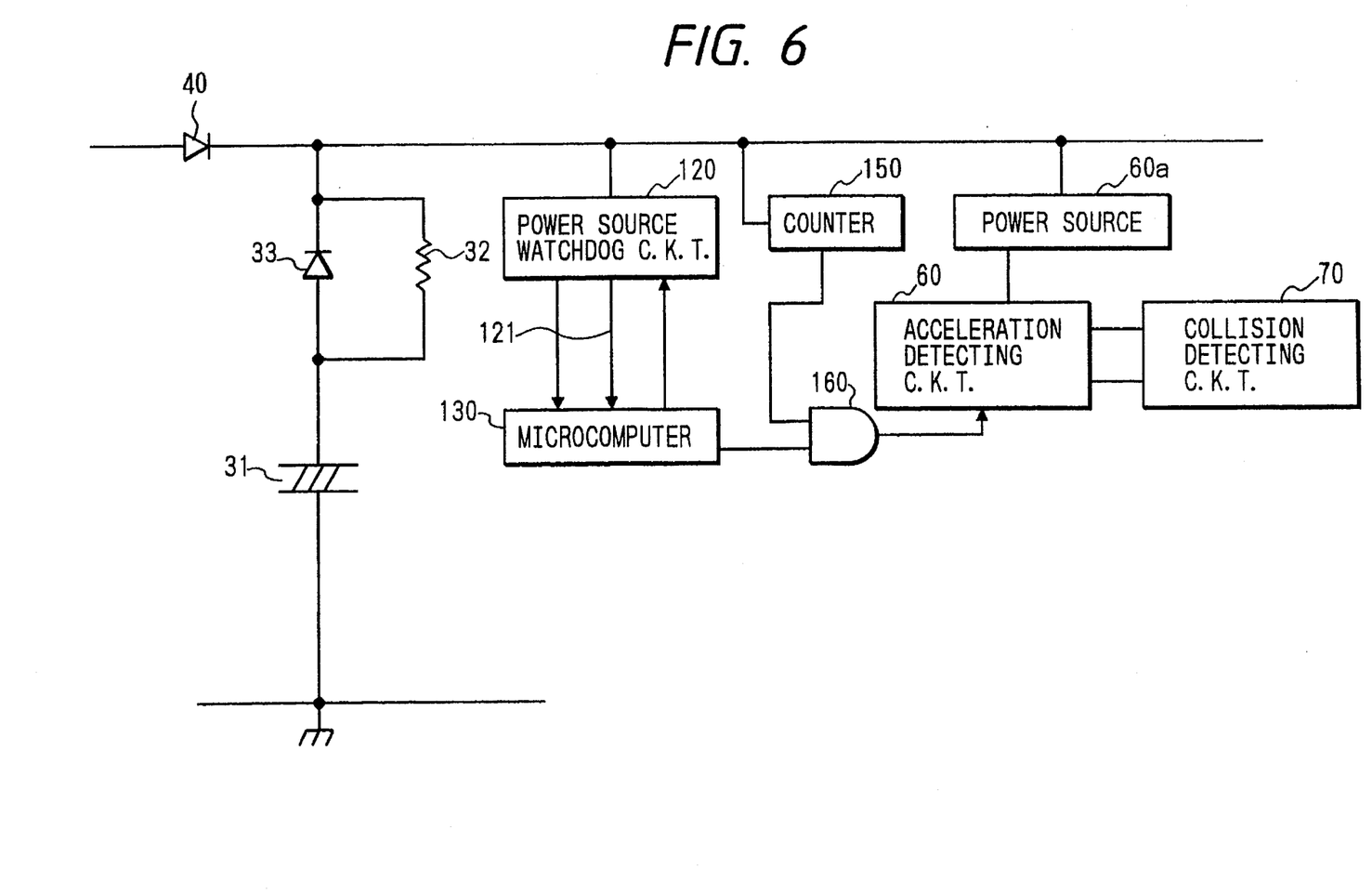
FIG. 6 is a circuit diagram which shows an essential part of a failure monitoring system of a third embodiment.

Referring to FIG. 6, there is shown a third embodiment of the present invention which represents a modification of the second embodiment as shown in FIGS. 4 and 5. This embodiment includes a counter 150 and an AND gate 160, and operates according to a flowchart which omits step 230 from the flowchart as shown in FIG. 3. The other arrangements and operation are the same as those in the above mentioned embodiments.

The counter 150 is responsive to the d.c. voltage from the battery 20 through the diode 40 upon actuation of the ignition switch to provide a HIGH-LEVEL power-on reset pulse signal to the AND gate 160 for a preselected period of time Ta. The time Ta is a critical value for determining whether the failure monitoring process should be carried out or not after the ignition switch IG is turned on. The AND gate 160 is responsive to the HIGH-LEVEL power-on reset pulse signal from the counter 150 to output the test signal provided from the microcomputer 130 to the acceleration detecting circuit 60.

In operation, when the ignition switch IG is turned on to apply the d.c. voltage from the battery 20 to the auxiliary power source 30, the constant voltage power sources 120 and 60a, and the counter 150 through the diode 40, the back-up capacitor 31 produces the capacitor voltage Vc, similar to the above embodiment. At the same time, the constant voltage power source 120 provides the constant voltage of 5 V and the reset pulse signal. The constant voltage power source 60a also provides the constant voltage of 5 V. The counter 150 is responsive to the d.c. voltage from the battery 20 to output the HIGH-LEVEL power-on reset pulse signal to the AND gate 160 for the preselected period of time Ta.

Accordingly, if a YES answer is obtained in step 220, concluding that the monitored voltage Vm represents the normal level, the routine then proceeds to step 230a wherein the test signal is outputted to the AND gate 160. At this time, if the preselected period of time Ta has not expired after the counter 150 outputs the power-on reset pulse signal, the AND gate 160 is energized by the HIGH-LEVEL power-on pulse signal from the counter 150 to provide the test signal from the microcomputer 130 to the acceleration detecting circuit 60. With this arrangement, the same failure monitoring process as the above embodiments may be carried out.

Additionally, when the driver starts the vehicle during repetition of step 250 after the power-on pulse signal from the counter 150 is changed to a low level, the watchdog circuit of the constant voltage power source 120 may, likewise to the above embodiments, serve to provide the reset pulse signal to the microcomputer 130 through the line 121, or a noise signal may appear on the line 121 due to static electricity or other such malfunction to be inputted to the microcomputer 130 as the reset pulse signal. When such conditions are encountered, the microcomputer starts to carry out the program again from step 200 in response to the reset pulse signal from the constant voltage power source 120 or the equivalent noise signal on the line 121. When the routine proceeds to step 230*a*, the test signal is outputted to the AND gate 160. However, as the power-on reset pulse signal represents a low level, the AND gate 160 does not provide the test signal to the acceleration detecting circuit 60.

Therefore, the microcomputer 130 does not perform the failure monitoring process regardless of the steps after step 240.

As clearly from the above, the failure monitoring system of the third embodiment is effective to detect a failure in the airbag starting unit S based on the test signal provided through the AND gate 160 within the preselected period of time Ta after the reset pulse signal from the power source 120 and the power-on reset pulse signal from the counter 150 are outputted in response to the turning-on operation of the ignition switch IG. Additionally, after the preselected period of time Ta, even when the reset pulse signal from the constant voltage power source 120 and/or the equivalent noise signal appearing on the line 121 are inputted to the microcomputer 130, the failure detecting process is not initiated as the AND gate 160 inhibits the output of the test signal to the acceleration detecting circuit 60.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the above embodiment is not limited to arranging the analog signal change-over switch 63 and the reference voltage generator 64 in the acceleration detecting circuit 60 and it is possible to arrange them in the collision detecting circuit 80.

In addition, a microcomputer which incorporates therein a power-down detecting circuit may be provided to use the output from the power-down detecting circuit in place of the capacitor voltage Vc.

Additionally, the failure monitoring system may include an arrangement wherein particular data which are to be erased upon turning off operation of the ignition switch IG are stored in a RAM provided in the microcomputer or an external memory. The determination of whether the ignition switch IG has just been turned on or not based on the data erased status in the memory upon turning on operation of the ignition switch IG may be made in step 230 in FIG. 3.

Further, a false signal generator which is operable to provide a false signal through the analog signal change-over switch 63 when monitoring a failure in the system, may be utilized instead of the reference voltage generator 64.

Additionally, the failure monitoring system of the invention is applicable to a keyless entry system of an automotive vehicle, or a passenger restraint system of an electric vehicle or a diesel power vehicle.

What is claimed is:

1. A failure monitoring system for a passenger restraint system, comprising:

an on-board power source;

a reset signal generator constructed and arranged to generate a reset signal in response to an actuation of said on-board power source;

a condition signal generator constructed and arranged to generate a condition signal in response to the actuation of said on-board power source, the condition signal being indicative of a condition associated with the actuation of said on-board power source, said condition signal generator further including an auxiliary power source comprising a back-up capacitor, said condition signal generator being constructed and arranged to generate the condition signal when a voltage charge level of said back-up capacitor is less than a fully charged voltage charge level of said back-up capacitor; and a failure monitor constructed and arranged to monitor a failure in the passenger restraint system when both the reset signal and the condition signal are input to said failure monitor.

2. A failure monitoring system as set forth in claim 1, wherein said condition signal generator is adapted to generate the condition signal only when said on-board power source is actuated, said failure monitor monitoring a failure in the passenger restraint system when the reset signal is input into said failure monitor within a fixed period of time after the condition signal is input thereto.

3. A failure monitoring system as set forth in claim 1, wherein said condition signal generator is constructed and arranged to generate the condition signal within a fixed period of time after said on-board power source is actuated.

4. A passenger restraint system, including a failure monitoring system, for a vehicle comprising:

a power source;

a first acceleration detector being constructed and arranged to generate an acceleration signal corresponding to a detected acceleration;

a second acceleration detector being constructed and arranged to detect an acceleration acting on the vehicle when a speed of the vehicle is greater than a threshold value;

a collision detector constructed and arranged to generate a collision indicating signal according to the acceleration signal generated by said first acceleration detector;

a passenger restraint device constructed and arranged to be actuated according to the collision indicating signal generated by said collision detector when said second acceleration detector detects an acceleration at a vehicle speed greater than the threshold value;

a false signal generator constructed and arranged to provide a false test signal to said collision detector, thereby causing said collision detector to output a collision indication signal when testing for a system failure;

a signal selector constructed and arranged to select and provide one of an acceleration signal from said first acceleration detector or a false signal from said false signal generator to said collision detector;

a reset signal generator constructed and arranged to provide a reset signal in accordance with an actuation of said power source;

a condition signal generator constructed and arranged to provide a condition signal in accordance with the actuation of said power source;

a test signal generator constructed and arranged to provide a test signal to said signal selector; and a failure monitor for monitoring a failure in a circuit including said signal selector, said collision detector, and said passenger restraint device, in accordance with the test signal from said test signal generator provided to said collision detector.

5. A failure monitoring system as set forth in claim 4, wherein said condition signal generator includes an auxiliary power source comprising a back-up capacitor and provides the condition signal when a charged voltage level of said back-up capacitor is lower than a fully charged voltage level of said back-up capacitor.

6. A failure monitoring system as set forth in claim 4, wherein said passenger restraint device includes a battery power source, wherein said condition signal generator provides a condition signal only when said battery power source is turned on, said failure monitor monitoring for a failure in said circuit when the reset signal is input within a fixed period of time after the condition signal is input thereto.

7. A failure monitoring system as set forth in claim 6, wherein said condition signal generator is constructed and arranged to generate the condition signal only during a fixed period of time after said battery power source is turned on.

* * * * *